US006684258B1

(12) United States Patent
Gavin et al.

(10) Patent No.: US 6,684,258 B1
(45) Date of Patent: Jan. 27, 2004

(54) STACKABLE RING NETWORK INCLUDING BURST TRANSMISSION OF DATA PACKET

(75) Inventors: Vincent Gavin, Galway (IE); Una Quinlan, Dublin (IE); Denise De Paor, Carraroe (IE); Tadhg Creedon, Furbo (IE); Nicholas M Stapleton, Uxbridge (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/547,759

(22) Filed: Apr. 12, 2000

(30) Foreign Application Priority Data

Dec. 23, 1999 (GB) ............................................. 9930302

(51) Int. Cl.⁷ .......................... G06F 15/16; H04L 12/42
(52) U.S. Cl. ...................... 709/251; 709/208; 370/455; 370/456; 370/223
(58) Field of Search ...................... 709/208–211, 251; 370/455, 424, 456, 452, 223

(56) References Cited

U.S. PATENT DOCUMENTS 4,726,018 A * 2/1988 Bux et al. .................. 370/455
5,142,530 A * 8/1992 Geyer et al. ................ 370/456
5,566,177 A * 10/1996 Bhandari et al. ........... 370/452
5,875,309 A * 2/1999 Itkowsky et al. ........... 710/113
6,330,245 B1 * 12/2001 Brewer et al. .............. 370/424
6,594,231 B1 * 7/2003 Byham et al. .............. 370/223

* cited by examiner

Primary Examiner—Wen-Tai Lin
(74) Attorney, Agent, or Firm—Nixon & Vanderhye PC

(57) ABSTRACT

A stackable network unit which can form a ring with other units has a master mode in which it can place packets on the ring, so that they can be ultimately forwarded from other units, and a repeat mode in which it can make a request for transfer of mastership of the ring, inserting bits in a header of an arbitration packet. If a master unit has completed the transmission of a packet and, preferably, after the required inter-packet gap has elapsed, it has not yet received an arbitration header to permit the making of an arbitration decision it can transmit a subsequent packet. The header information of this packet indicates to the other units that this subsequent packet is part of a burst of packets and the other units should not set requests in the header of this packet because this packet would not be used for arbitration. The master unit indicates the nature of the subsequent packet by setting a sequence number in the header of the packet to distinguish it and following packets in a burst from the 'first' packet which is the one used to pick up requests from the units that may need to become the master unit.

5 Claims, 7 Drawing Sheets

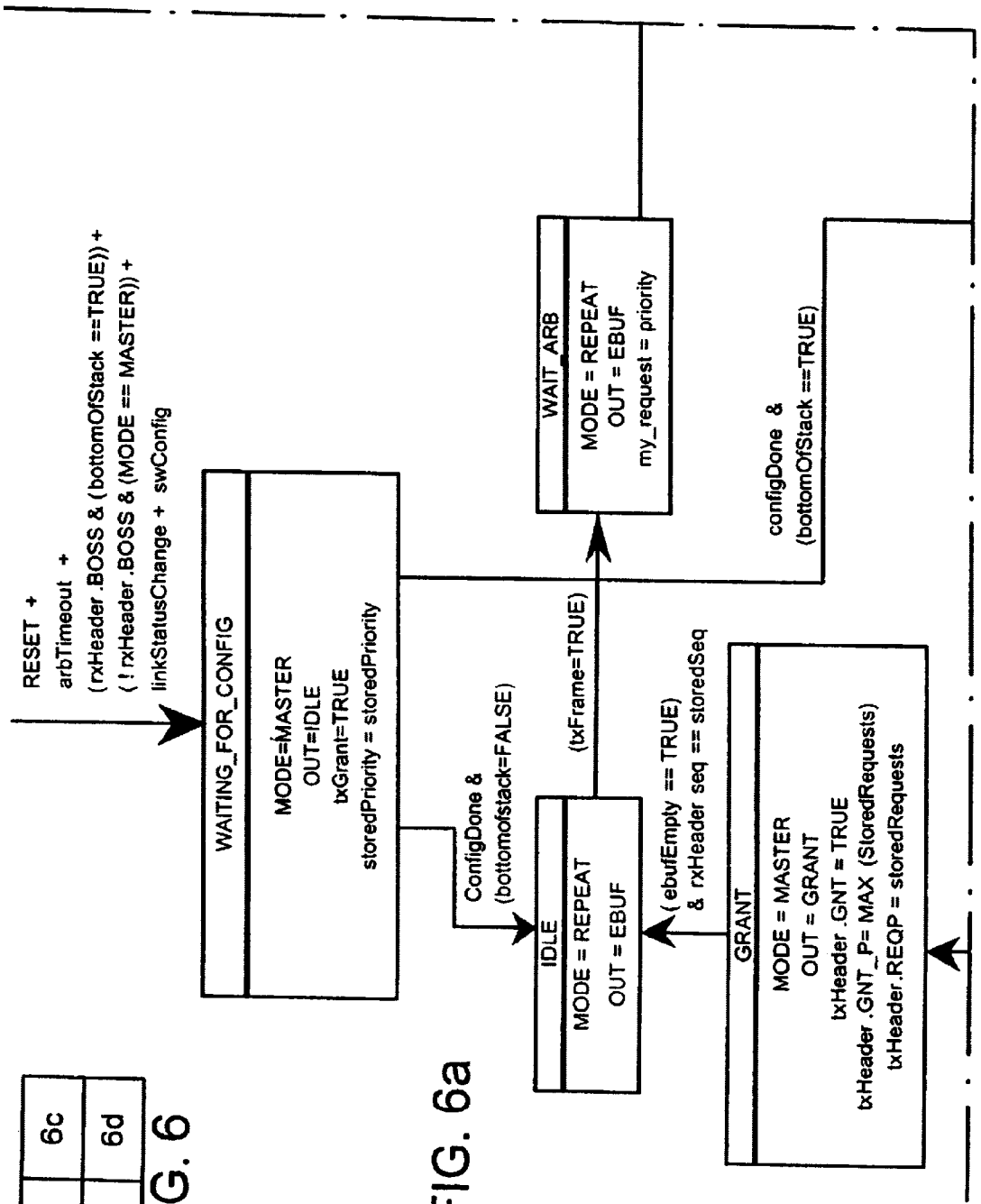

STACKABLE RING NETWORK INCLUDING BURST TRANSMISSION OF DATA PACKET

FIELD OF THE INVENTION

The present invention relates to stackable units in packet-based communication systems and in particular to stackable hub units which can be 'stacked' or connected in a ring so that the units form a single logical entity.

BACKGROUND TO THE INVENTION

When units are stacked to form a single logical device such as a hub or switch, a user connected to a port of any one of the units can send packets to or receive packets from users connected to any of the ports on any of the units, as if all the ports were ports of a single multi-port device. In such a system, the units may be connected to form a closed path or ring by means of which packets can circulate from the unit having the port at which they are received to the unit having the port from which they need to be forwarded.

It is necessary to provide some means of arbitration between requests by the units for access to the ring, that is to say for the ability to place a packet on the ring. This may be achieved in practice, as disclosed in GB patent application number 9812081.9 filed Jun. 5, 1998, and in the corresponding U.S. patent application Ser. No. 09/207655, U.S. Pat. No. 6,330,245 in the name Brewer et al, filed Dec. 9, 1998, by providing in each of the units a state machine which enables each unit to request access to the ring by forming an arbitration packet resembling an Ethernet packet but containing a header which contains appropriate fields. More particularly each of the units may be responsive to packet headers circulating with arbitration and priority fields to conduct an arbitration process which enables one and only one of the units at a time to be a master which supplies packets to the ring and can conduct an arbitration process by which it may retain or relinquish mastership of the ring, thereupon another unit requesting access to the ring can become the master.

In order to enable units to operate in this manner, the aforementioned patent applications describe a physical structure in which each unit has two cascade ports, known as the "down" and "up" ports respectively. Each of the units defines two signal paths, one proceeding from the "down" port to the "up" port and the other in the reverse direction. The first of these paths may contain the arbitration process by which in normal operation of the stack the identity of the master unit is established and, for that unit, packets are allowed to enter the ring. The second path is a return path by means of which packets return around the ring. Each unit is so organised that if there is no connection to a particular cascade port, packets or frames on the path to that port will bypass the port and be transmitted back along the other path towards the other port of the same unit. If a cascade port is connected to a port on another hub unit, then a packet arriving at that port will be forwarded to the other hub unit. The units are, or should be, connected so that one, and only one of them is at the 'bottom' of the stack. Such a unit should have no unit connected to its 'down' port. It will preferably be the only unit in an idle master state as a preliminary to the arbitration process which can occur only if at least one unit needs access to the ring for placing packets thereon.

In a ring structure which has a distributed arbitration scheme as exemplified in the aforementioned patent applications it is the responsibility of the current master unit to arbitrate between the units which have placed requests to become the next master unit. These units may indicate to the current master unit the request to become master by setting a request bit in the header of the packet from the master unit as the packet traverses the ring. When the master receives its own packet back it extracts the attached requests from the headers and arbitrates between the requests based on the priority level of the individual requests. The master then sends a grant packet which denotes the surrender of mastership of the ring and its transfer to a successful requesting unit having the priority level indicated in the grant packet The time taken for a packet to complete a traversal of the ring and to return to the master unit originating the packet will depend upon the number of units in the ring and the latency involved in passing through a unit in the ring. If the number of units in the ring is small and the packet being transmitted by the master is long then the master may receive back the start of its own packet before it has finished transmitting the end of it. In this case, as soon as the master has finished transmitting the end of the packet it can make an arbitration decision using the requests it has received from the header of the packet and, after the customary inter-packet gap required by the system, it may send out a grant packet.

However, if the ring is large and the packet being transmitted is small then the master will have finished transmitting the packet long before it as received the header of the packet back again and so it cannot yet make a decision on which unit should be the next master. Therefore nothing useful is transmitted and the bandwidth of the system is wasted.

The present invention is aimed at improving the performance of a ring of stacked units with distributed arbitration.

SUMMARY OF THE INVENTION

The invention provides, broadly, a scheme in which if a master unit has completed the transmission of a packet and, preferably, after the required inter-packet gap has elapsed, it has not yet received a header to permit the making of an arbitration decision it can transmit another packet. The header information of this packet would indicate to the other units that this subsequent packet is part of a burst of packets and the other units should not set requests in the header of this packet because this packet would not be used for arbitration. The master unit may indicate the nature of the subsequent packet by setting a sequence number in the header of the packet to distinguish it and subsequent packets in a burst from the 'first' packet which is the one used to pick up requests from the units that may need to become the master unit The scheme may readily be arranged so that if after a second packet is sent and the master unit has still not received the header from the first packet it may send another packet with an incremented sequence number. The current master unit may continue this process until a maximum sequence number is reached, determined by the size of a field indicated or available in the header. A larger field for the sequence number may allow more packet bursting but a limit is set by the time it takes the smallest packet that can be supported to traverse the largest ring that may be accommodated.

When the header of a first packet in a sequence is received a master unit should make an arbitration decision and if appropriate, grant a new mastership of the ring to a new master unit. However a current master unit should still remove from the ring all the subsequent packets in the burst to ensure that they do not traverse the ring more than once.

Preferably the master removes all packets until it sees a packet with a sequence number equal to the number of packets that it has sent in a burst.

If a master decides in an arbitration phase that it should remain the master of the ring because it has a higher priority than any other requesting unit then it may reset a sequence count to zero and send a first packet with a sequence number set to the datum (zero).

DETAILED DESCRIPTION OF A PREFERRED EMBODIMENT

Figure 1:
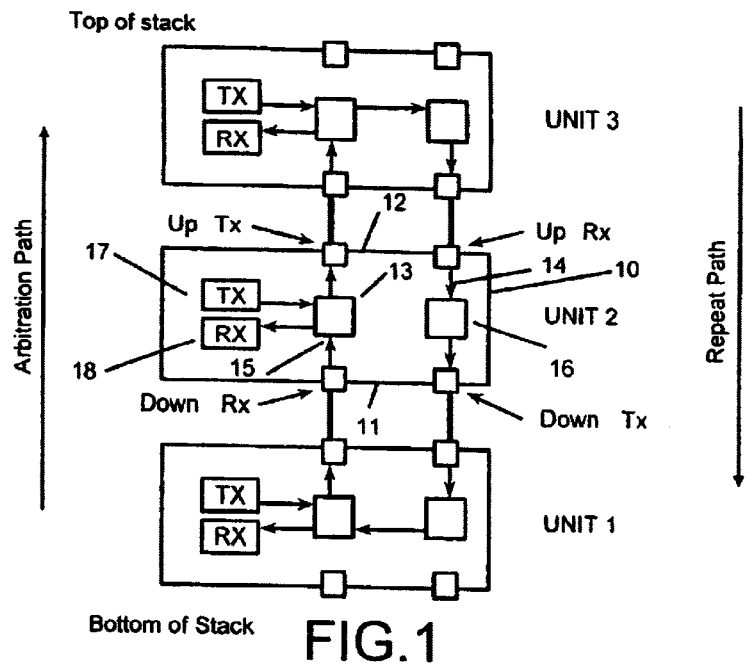
FIG. 1 illustrates a stack of network units.
Figure 6B:
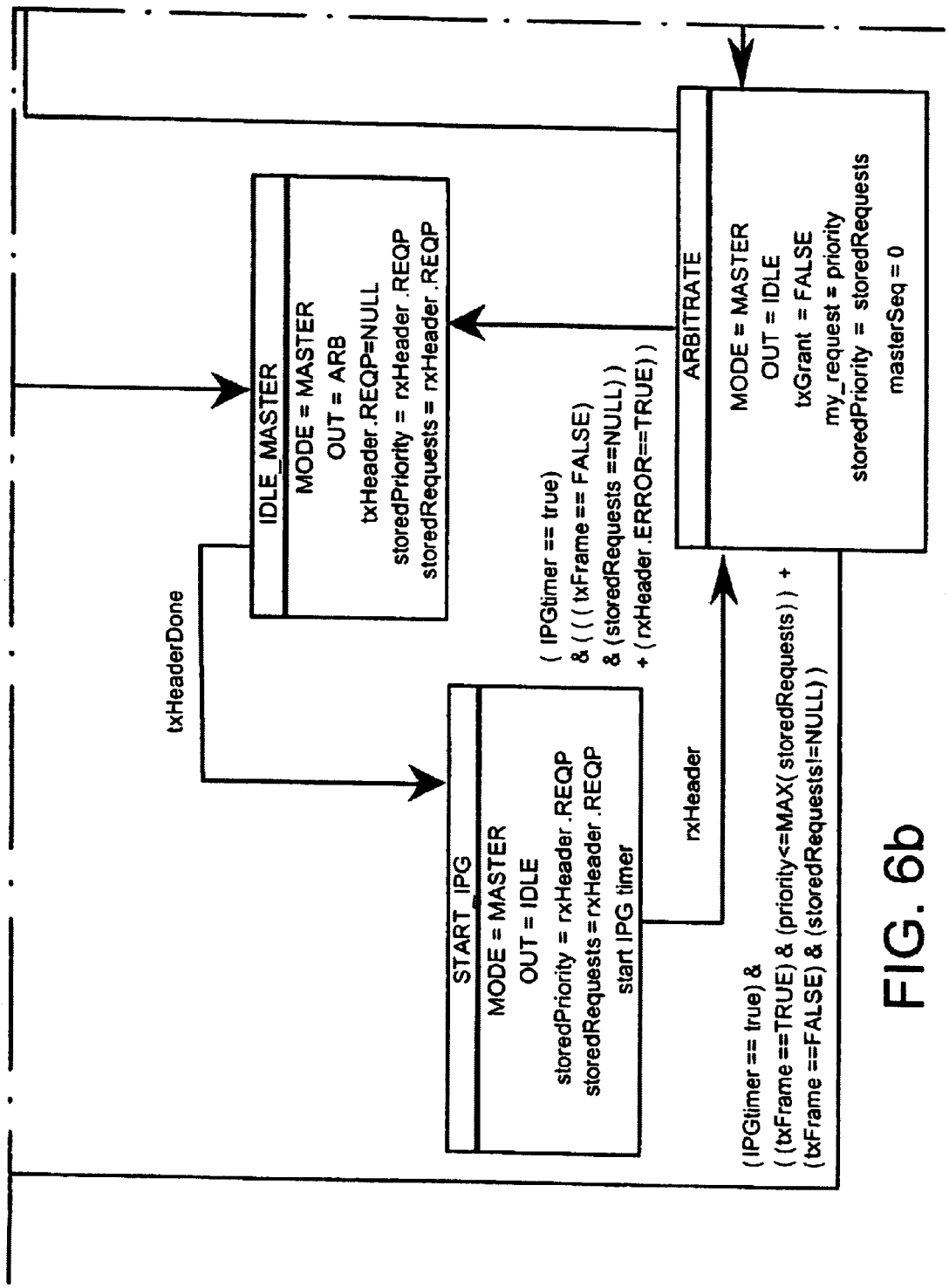
FIG. 6 illustrates one example of a state machine for a unit participating in a ring in accordance with the invention.
Figure 6C:
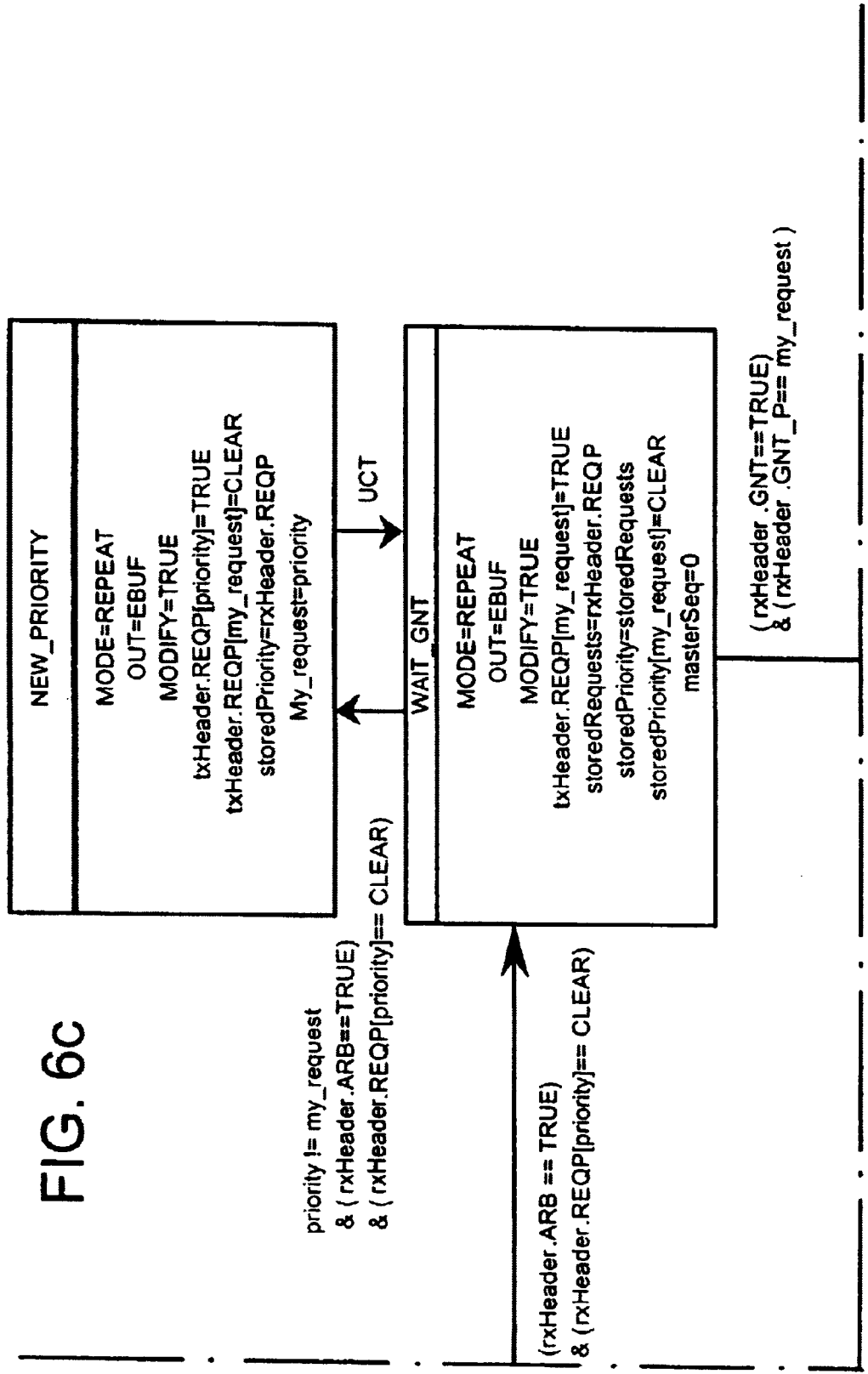
Figure 6D:
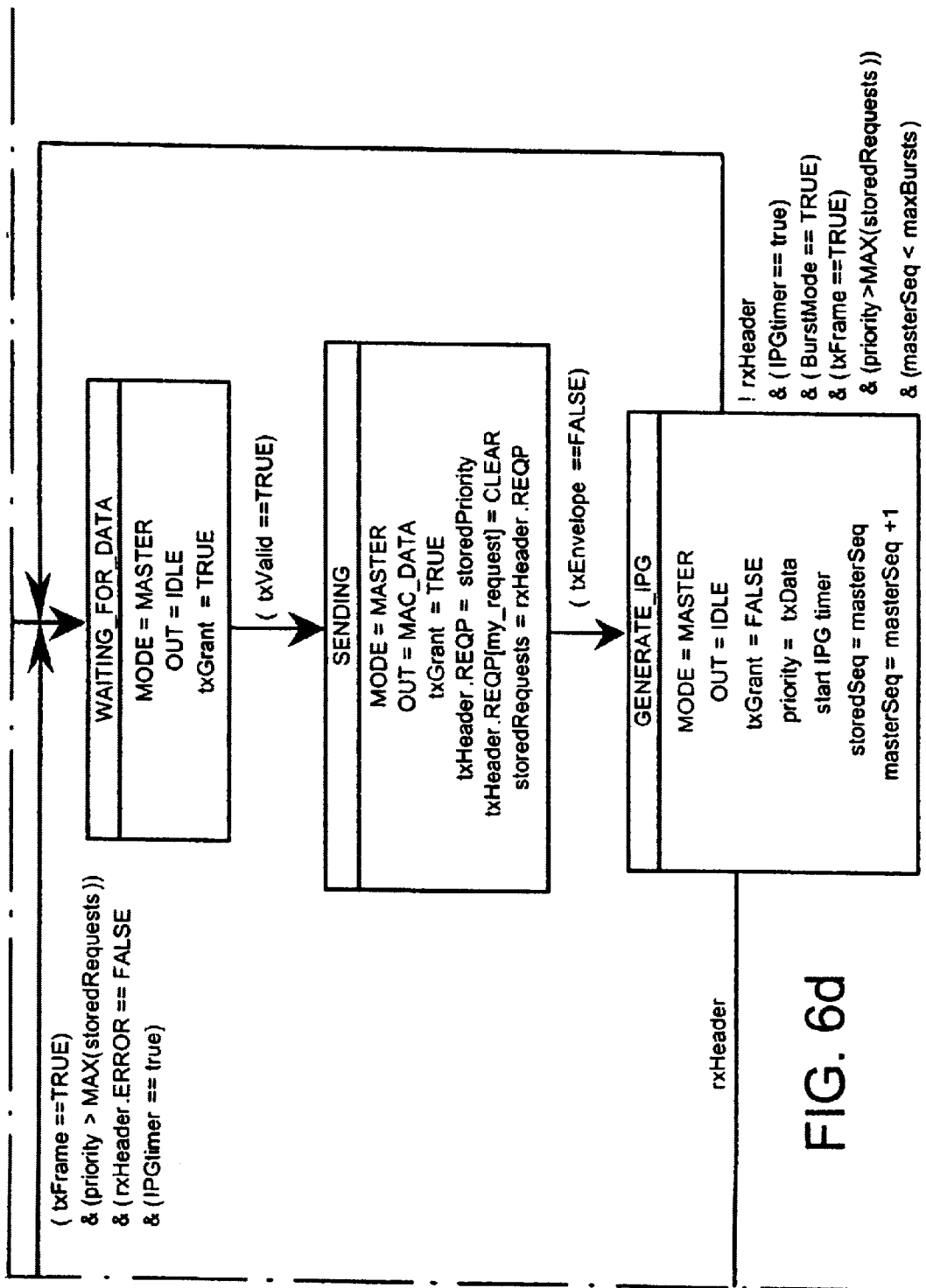

FIG. 1 illustrates schematically three stacked hub units, designated 'unit 1', 'unit 2', and 'unit 3', connected together to form a rinse for the circulation of packets that may be put on the ring by any one of the units. It will be understood that only one unit at any time may in normal operation place packets on the ring. The mode of such a unit is 'MASTER', the mode of other units is 'REPEAT' as indicated in FIG. 6. Each of the units is similar and for convenience only the middle unit will be described in detail. This unit is a hub unit 10 which has in addition to its ordinary ports (not shown) two duplex cascade ports, a first port 11, conveniently called 'down' port, and a second port 12, conveniently called 'up' port. The unit 10 includes two signal paths between these two ports. A first path, which for various reasons is preferably termed the arbitration path, proceeds from the 'down' port 11 of the unit to the 'up' port 12. It is convenient to subdivide the functions of the ports into receive and transmit (Rx and Tx respectively). Thus the arbitration path 13 proceeds from the down Rx terminal to the up Tx terminal. A second or return path 14 extends from the port 12 to the port 11, and in particular from the 'up Rx' part of the second port 12 to the 'down Tx' part of port 11.

The forward or arbitration path 13 includes a processing section 15 which in the normal operation of the hub unit cooperates with arbitration packets that are sent around the ring and which, as briefly described later, and as more fully described in the aforementioned applications, enable the units to determine which will be the master unit (placing packets on the ring) at any time in a manner which grants the units a fair access to the ring. In FIG. 1, the processing function 15 is shown as connected to a transmit (TX) section 17 and a receive (RX) section 18. These are intended to represent the transmitting and receiving functions respectively of the hub unit, which in respect of its connection to ports (not shown) is intended to be of known form. A single hub can broadcast a packet received at any port to all its other ports and the purpose of stacking units is to provide a hub unit with many more ports than can conveniently be provided on a single commercially acceptable unit The return path 14 includes a processing section 16. Both this section and section In are merely schematically represented in FIG. 1 and are described in more detail in FIG. 2.

Figure 2:
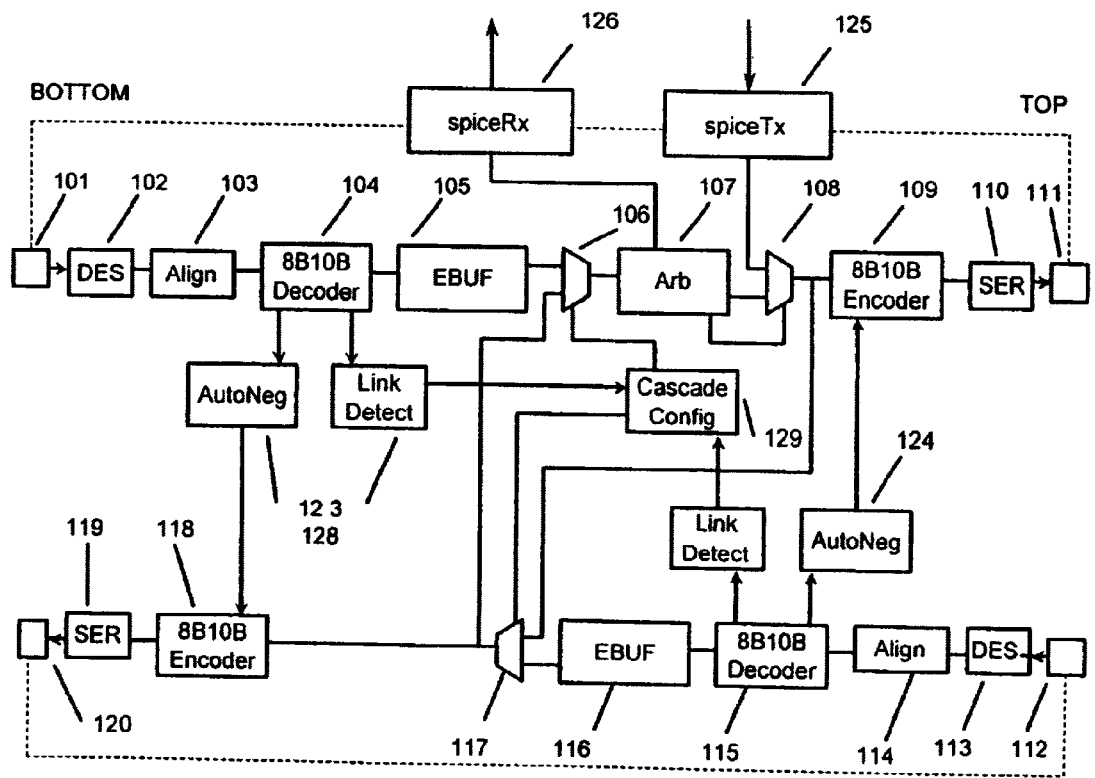
FIG. 2 illustrates one of the units in greater detail.

Before leaving FIG. 1, and by way of introduction to FIG. 2, it may be remarked that each unit is adapted to sense whether a given port is connected to another operative unit. This may be performed in known manner, by the process set out in IEEE standard 802.3-1998, clause 37 but briefly the effect is that if either the up or down ports are not connected to another operative unit, the unit causes that port to be internally bypassed by packets which would otherwise proceed towards that port. Thus as shown for unit 1, for which the 'down' port is not connected to another unit, packets would proceed alone the return or repeat path towards the down port, internally bypass that port and proceed to the first or arbitration path. Likewise, as shown for unit 3, of which the 'up' port is not connected to another unit, packets that proceed towards the 'up' port along the arbitration path internally bypass that port to the return path. In this manner, as also explained in the aforementioned patent applications, the units define a cascade within which is provided a ring for the circulation of packets.

In the example shown in FIG. 1, unit 1 is at the 'bottom' of the stack. As is explained in GB patent application No. 9910895.3 and corresponding U.S. patent application Ser. No. 09/369,323, U.S. Pat. No. 6,394,231 owing to the possibility of the use of 'resilient' cable or incorrect combinations of cables, it cannot be presumed that unit 1 will be at the bottom of the stack and it is desirable to provide a configuration process to determine which unit is deemed to be at the bottom of the stack and (in the idle state) is initially deemed to be the master unit. Such a process is not important for the present invention.

FIG. 2 illustrates the general layout of a unit. This may be generally in the form described in the earlier applications and accordingly need only be described in a summary manner. Signals received at the down RX terminal 101 are de-serialised in block 102, aligned in block 103, decoded in an 8B10B decoder 104, stored temporarily in elastic buffer 105, and coupled to one input of multiplexer 106. The output of multiplexer 106 is coupled to an arbitration unit 107 (generally described in the aforementioned applications) and the arbitrator path includes a multiplexer 108, an 8B 10B encoder 109, and serialiser 110 coupled to the up transmit terminal 111.

The down path commences with the up receive terminal 112 and proceeds through a deserialiser 113, an alignment block 114, an 8B10B decoder 115, an elastic buffer 116, a multiplexer 117, an 8B10B encoder 118, and a serialiser 119 to the down transmit terminal 120.

A conventional auto-negotiation circuit 123 is coupled to the decoder 104 and the encoder 118 and a corresponding auto-niegotiation circuit 124 is connected to the decoder 115 and the encoder 109.

Among other things, the purpose of the multiplexers 106 and 117 is to provide a bypass of the down port (101/120) and one purpose of the multiplexer 108 and the multiplexer 117 is to provide bypass of the up port (111/112). Multiplexer 108 also serves, under the control of the arbitration unit 107, to provide packets onto the ring if the unit is acting as a master, as described in the aforementioned applications. Packets from ports (not shown) arrive by way of a bus 125. Packets can leave the ring at arbitration unit 107, if the respective unit is the 'master'. At all other units in the ring, the arbitration unit copies packets to the encoder 109 via the multiplexer 108 and, if a relevant destination field in the headers of the packets is set, also copies the packets to the bus 126.

A link detection function 128 coupled to decoder 104 is generally configured as a RX sync function in accordance with IEEE Standard 802.3 (1998) Clause 37, but may include an error rate threshold counter with a threshold which, if exceeded, is used as a criteria for a link failure. Thus if the down port (101/120) is not receiving signals, either the unit is at the bottom of the stack or a stack failure has occurred. There is also a link detect function 127 which is coupled to decoder 115. The link detect functions 127 and 128 can, by way of the cascade configuration function 129, operate multiplexers 106, 108 and 117, depending on circumstances, so that if there is no unit connected to the down port, packets or headers arriving at multiplexer 117 will be routed by way of multiplexer 106 back to the up path. Likewise, if there is no unit connected to the up port, packets or headers passing through arbitration unit 107 and arriving at multiplexer 108 will be routed by way of multiplexer 117, thereby bypassing the up port.

Thus when a cascade port is connected to another port it will first use (in this example) the RX sync function to establish if a valid connection exists. If so, it will auto-negotiate to establish the capabilities of the connected device and, if the device is capable of being connected in the cascade, this will be indicated to the link detect block and the multiplexers will be set such that the port is connected into the cascade ring.

The foregoing description relating to FIG. 2 is similar to that in British Patent Application No. 9910895.3 filed May 12, 1999.

FIGS. 3A to 4B illustrates transmission of packets around the ring in schematic terms. The units are denoted 1, 2, 3, 4 and N. The current master unit, in this example unit 1 in FIG. 3A, puts onto the ring a packet P0 with a sequence number (described with reference to FIG. 5) set to zero. FIG. 3B illustrates the ring after the packet P0 has reached another unit (in this case unit 4) which has data to send and inserts a request (to become the master) in the header of packet P0.

Figure 4A:
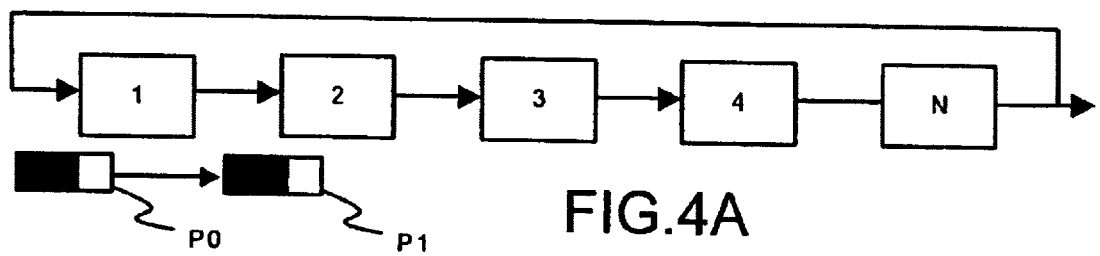
FIGS. 4A to 4B illustrates the circulation of packets in greater detail.
Figure 4B:
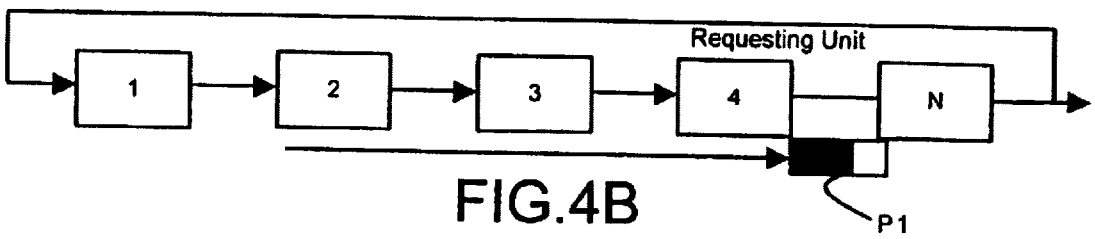

As will be apparent when FIG. 5 is described, after the 'master' unit has sent packet P0 it enters a GENERATE_IPG state, wherein a timer for the predetermined inter-packet gap has been started. If the timer times out (i.e. at the end of the inter-packet gap) and packet P0 has not yet returned to the master the master can send another packet. This is shown more particularly in FIGS. 4A and 4B. FIG. 4A illustrates packet P1 sent from master unit 1 just before packet P0 arrives back at the master unit. FIG. 4B illustrates the arrival of packet P1 at its destination on the ring (in this case unit N). This packet will arrive at its destination on the ring before that destination unit receives from the master any packet which denotes any change in mastership, since such a packet has to be dispatched by the master unit subsequent to the arrival of packet P0 at the master and cannot 'overtake' packet P1. It will be understood that packet P1 and any subsequent packets sent in a burst after packet P0 needs to have a header which enables any non-master unit to recognise the packet as one to which a 'request' for grant of mastership may not be appended.

FIG. 5 illustrates by way of example packets which may be employed for conducting the distributed protocol characteristic of the ring. Packets are conveyed around the ring so that a packet received on one unit can be dispatched from another unit and vice versa. The destination of a packet on the ring will, as is usual for these systems, be determined by the destination media access control address contained within the packet.

A stack of units such as has been described will have one unit at a time in a 'master' mode and the other unit or units in a 'repeat' mode. Only a unit in the 'master' mode may place packets on the ring. The unit or units which are in the 'repeat' mode can on receiving a packet which is already on the ring forward the packet around the ring. It may also insert in a 'arbitration' header of a packet a 'request' for transfer of the mastership of the ring. It does this by setting a respective bit in a 'request priority' field of an arbitration header. Whichever bit is set identifies the priority level of a unit which has data to send and needs transfer of the mastership of the ring in order to be able to place packets onto the ring. The headers of packets on the ring also include a field, in this example the arbitration/grant field (Arb/Gnt), which when set to one value ('0') indicates that the header is an arbitration header and when to set to the other value ('1') indicates that the header is a grant header In this example, as in the examples in the earlier applications, the arbitration field and the grant field are the same. This is not necessary to the present invention but is an efficient expedient.

If the master unit receives back a packet which has an arbitration header (Arb/Gnt set to '0') with a bit set in the priority field, it will arbitrate and on the assumption that a unit requesting transfer of the mastership by the setting of a priority bit can be granted mastership, the master will relinquish the mastership. In particular the master unit issues a packet (or a fragmentary packet) of which the header now has the Arb/Gnt field set to '1' and which has a three-bit field set to identify the priority level to which the mastership of the ring shall be granted, so that a unit having that priority level can become the master.

Figure 5A:
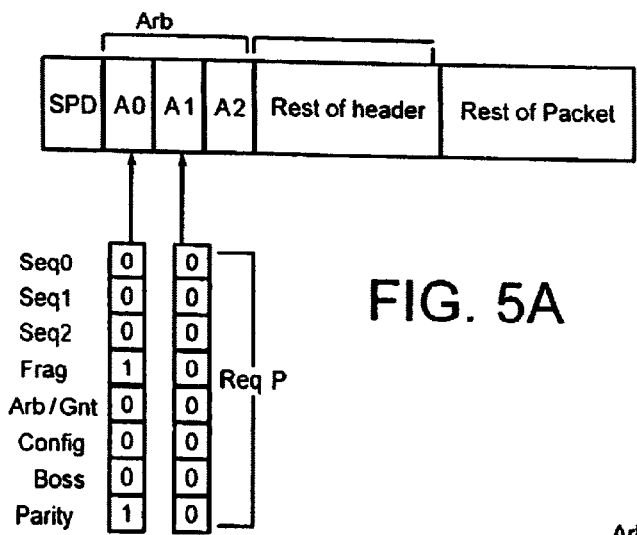
FIGS. 5A to 5C illustrate various packets which have headers that may convey information around a ring in accordance with the invention.
Figure 5B:
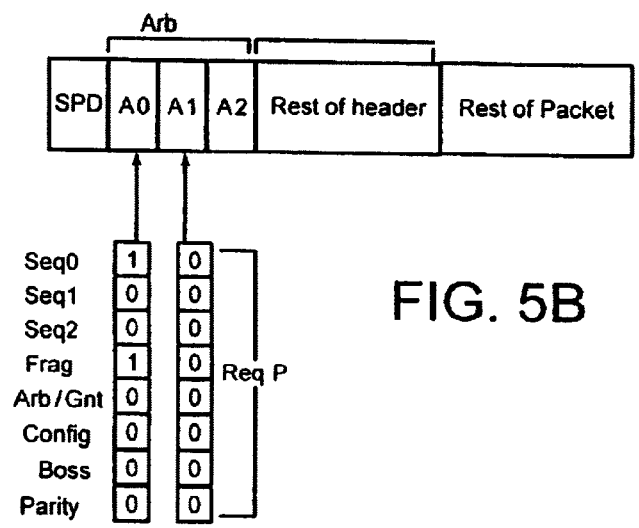
Figure 5C:
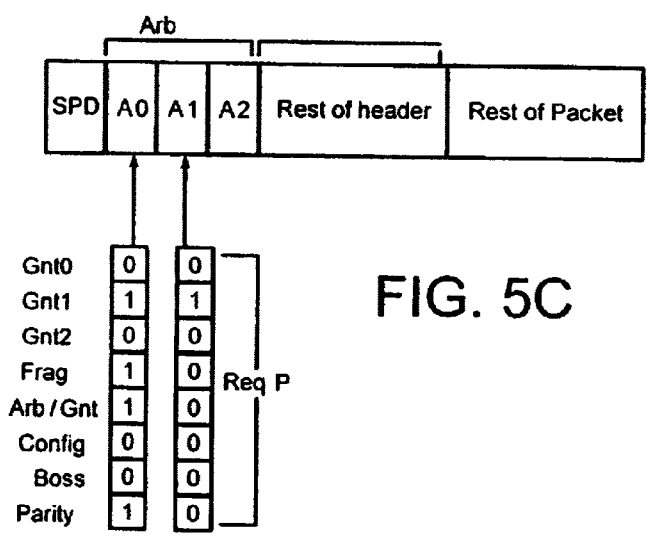

Reference may now be made to FIGS. 5A–5C which illustrate in simplified form packets with arbitration headers (Bytes A0, A1 and A2) as may be employed in the present invention.

For the sake of efficiency and simplicity, not all the packet will be described. It generally conforms to the kind of packet and header described in the earlier applications. Where in this example the packet differs from the headers described in the earlier applications lies in the usage of the first three bits (denoted Seq0, Seq1 and Seq2) in a header wherein the Arb/Gnt bit is set to zero.

As is described in the earlier of the aforementioned applications, the packet starts with a start of packet delimiter (SPD) and, at least while it is on the ring, has an arbitration header including two bytes A0 and A1 which will be more specifically described later. A third byte A2 contains, as described in application number 9910895.3, data relating to the status of the up and down ports, and an identification of the unit within the ring, described in that aforementioned application as the 'box ID'. Subsequent bytes in the header, shown in FIG. 5 as the 'rest of header' may identify the MAC addresses of the source and destination units in a manner customary in addressed packets and also as shown in any of the aforementioned applications.

The first packet sent by the master, will normally be as shown in FIG. 5A.

When the Arb/Gnt field is set to '1' as shown in FIG. 5C then the first three bits in byte A0 indicate (in binary coded form) the priority level to which mastership is to be granted. To distinguish then they are denoted Gnt0, Gnt1 and Gnt3 in FIG. 3C.

If the header is not granting transfer of the mastership of the ring, the Arb/Gnt field being set to '0' then the first three bits of the byte A0 are not required to identify the grant priority level and may therefore be used to denote a sequence of packets in a burst.

Figure 3A:
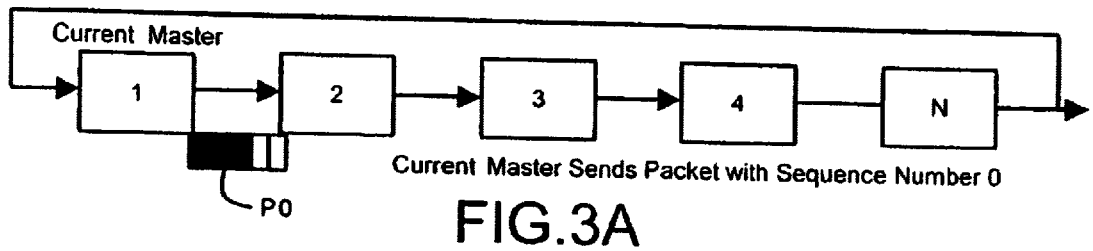
FIGS. 3A to 3B illustrates the circulation of packets in a ring.
Figure 3B:
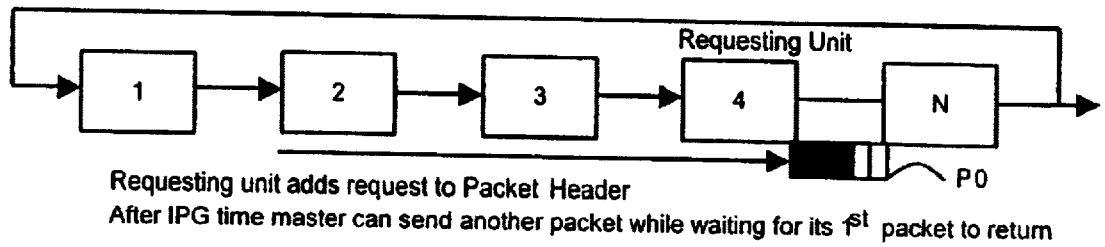

When the master sends a packet P0 as shown in FIG. 3A, such a packet will have its Arb/Gnt field set to '0' and the three sequence field bits all set to zero. The other units in the ring can recognise such an arbitration header as one in which a request priority bit in byte A1 can be set to indicate a request for the transfer of the mastership of the ring.

As noted previously, the present system differs from the earlier system in that if the inter-packet gap after sending packet P0 has expired and packet P0 has not yet returned around the ring, then (if enabled to send a burst of packets) the master unit may send subsequent packets such as packet P1 as shown in FIG. 4A. Such a packet will have as shown in FIG. 5B the sequence field set to unity. Thus the one-bit field Seq0 will be set to '1' whereas Seq1 and Seq2 will still be at '0'. In this example the sequence field can accommodate up to eight packets in a burst.

The arbitration unit in the other network units in the stack may only set a request priority bit in byte A1 if the Arb/Gnt field is set to '0' and the sequence field bits are all zero.

It will be apparent that this particular implementation uses the available grant priority field, namely the first three bits of byte A0, in an efficient way, using them to denote the sequence of packets in a burst when the field does not have any other use. However, other representations which employ a dedicated field exclusively for indicating the sequence of a packet and the use of different fields to denote arbitration and grant headers could be employed.

It will be noted, purely for the sake of completeness, that the fields 'frag', 'config', 'boss' and 'parity' in byte A0 are intended to have the meanings which are attributed to them in the aforementioned application number 9910895.3. More particularly, the one-bit field 'frag' indicates whether the packet is a full packet or a fragment (for example having no message data), the 'boss' field indicates whether the sender is at the bottom of the stack, the 'config' field is used to indicate whether the packet is a 'configuration' packet employed to determine which unit is at the bottom of the stack having regard to the connections made between the units, as described in that aforementioned application, and the 'parity' field is set in order to give the byte A0 a predetermined parity, such as even. These last mentioned four fields are of no direct importance to the present invention.

FIG. 6 illustrates an example of a state machine for the arbitration unit 107 in a unit according to the invention. This Figure will not be described in detail, because, except for two modifications, one in respect of the configuration of the units, and the other in respect of the sending of a burst of packets by a master unit the state machine corresponds to that already described in the earlier application number 9810281.9 (published as GB-2338155on Dec. 8, 1999). The meanings of the various signals shown by the transitions between states are intended to be as described in that application.

If a unit has no data to send, and is in a 'IDLE' state, it may be either in the 'IDLE MASTER' state wherein it outputs arbitration headers but no message packets. All the other units will be in the 'IDLE' state and the 'REPEAT' mode. If a unit in the 'IDLE' state has data to send, with txFrame being true, it enters the 'WAIT ARB' state wherein it sets a bit in the request priority field (unless the priority bit is already set, indicating that there already exists another unit with the same request). The unit then enters the 'WAIT GRANT' state (which may be altered by an excursion to the 'NEW _PRIORITY' state). The unit becomes the master unit when it leaves the 'WAIT GRANT' state and enters the 'WAITING FOR DATA' state. When it is in the 'SENDING' state, the 'master unit' can place packets on the ring. The master unit then enters the 'GENERATE_IPG' state wherein the inter-packet gap timer is started. On the assumption that the burst mode has not been enabled, then, as described in the earlier application, the master unit will enter the 'ARBITRATE' state. If there is no successful competition for priority, the master unit will then revert to the 'WAITING FOR DATA' state and in due course send another packet onto the ring. If however another unit is awarded 'priority' and needs a transfer of the mastership of the ring, the master unit enters the 'GRANT' state, where it sends a packet with an arbitration grant header (Arb/Gnt set to '1') and then the master unit leaves the master state and enters the 'IDLE' state.

Two modifications to the state machine described in GB-23388155-A are shown in FIG. 6. The first is an additional state denoted 'WAITING FOR CONFIG' wherein the units need to be configured to determine which unit is at the 'bottom of the stack' as described fully in application number 9910895.3. The configuration process may be needed not only for 'power up' but also when the configuration of the units is changed or, for example, when a link between units becomes inoperative. The result of the configuration process is to identify one of the units as being in the 'IDLE MASTER' state, which the unit will enter if the 'bottomOfStack' signal is 'TRUE' All the other units, for which 'bottomOfStack' will be 'FALSE' will enter the 'IDLE' state. The configuration process is not an essential part of the invention and it is mentioned here only for completeness.

The second, and more important modification to the state machine shown in the earlier published application is the additional transition between the 'GENERATE_IPG' state and the 'WAITING FOR DATA' state This is the transition which enables the sending of a burst consisting of more than one packet in the interval between the expiry of the inter-packet gap after the first packet sent by the master and the return of the first packet (with an arbitration header) to the master unit.

This transition will be executed provided that an arbitration header has not been received (!rxHeader), the inter-packet timer has timed out (IPGtimer=true), the burst mode is enabled (BurstMode=TRUE), there is a packet to send (txFrame=TRUE), the priority of the master is equal or greater to any previous stored requests, and the burst limit (in this case seven packets) has not been exceeded.

The foregoing description is given by way of example, chosen to match the distributed protocol disclosed in the aforementioned applications. However it will be apparent to those skilled in the art that the invention is more generally applicable to other distributed protocol arrangements wherein a 'master' unit will send a packet or frame with a header constituting an invitation for requests for transfer of the mastership of the ring and can utilise some of the delay between the sending of such a packet and its return to send additional packets in a burst, the system preferably having some means, in this case the interpretation of the arbitration field and the sequence field, to ensure that the other non-master units in the ring will not place requests on packets after the first in a burst of packets.

What is claimed is:

1. A network unit for sending and receiving data packets and connectable in a ring with other similar units, the network unit having:
   a master mode, wherein it can place packets on the ring and arbitrate in response to requests for mastership in packets received from the ring to determine whether to retain or relinquish mastership; and a repeat mode, wherein the network unit can forward on the ring packets received by way of the ring but is not permitted to place packets on the ring, and wherein the network unit is permitted to insert a request for transfer of mastership in a packet and in response to a packet denoting a transfer of mastership to the network unit to change from the repeat mode to the master mode;

wherein the network unit in said master mode is operative to send, after an arbitration packet into which a request for transfer of mastership can be inserted by another unit, and before said arbitration packet returns to said network unit by way of said ring, at least one further data packet and said at least one further data packet has a header which prevents other units from inserting said requests for transfer of the mastership of the ring.

2. A network unit according to claim 1 wherein said network unit causes said further data packet to indicate a sequence number.

3. A network unit for sending and receiving data packets and connectable in a ring with other similar units, the network unit having:

a master mode, wherein it can place packets on the ring and arbitrate in response to requests for mastership in packets received from the ring to determine whether to retain or relinquish mastership; and a repeat mode, wherein the network unit can forward on the ring packets received by way of the ring but is not permitted to place packets on the ring, and wherein the network unit is permitted to insert a request for transfer of mastership in a packet and in response to a packet denoting a transfer of mastership to the network unit to change from the repeat mode to the master mode;

wherein the network unit in said master mode is operative to send, after an arbitration packet into which a request for transfer of mastership can be inserted by another unit, and before said arbitration packet returns to said network unit by way of said ring, at least one further data packet;

wherein the operation of the unit is controlled by a state machine which includes, when the network unit is in the master mode;

a first state in which the network unit is waiting for data;

a second state wherein the network unit is placing packets on the ring;

a third state in which the network unit provides an inter-packet gap; and a fourth state in which the network unit is arbitrating whether to retain or relinquish mastership of the ring;

wherein the state machine may transition from the third state to the fourth state when said arbitration packet is received and may transition from the third state to the first state in the absence of reception of said arbitration packet in order to send said at least one further data packet onto the ring.

4. A network unit according to claim 3 wherein packets placed by the network unit on the ring during said master mode include a header which includes a first field and a second field, said header can convey a request for mastership of the ring when said first and second fields have respective first predetermined values, and said header indicates a sequence number of packets in a burst when the first field has its first respective predetermined value and the second field has a value other than its said first predetermined value.

5. A network unit according to claim 4 wherein said header denotes a transfer of mastership when said first field in the header has a second predetermined value.

* * * * *